Figures 1, 2:
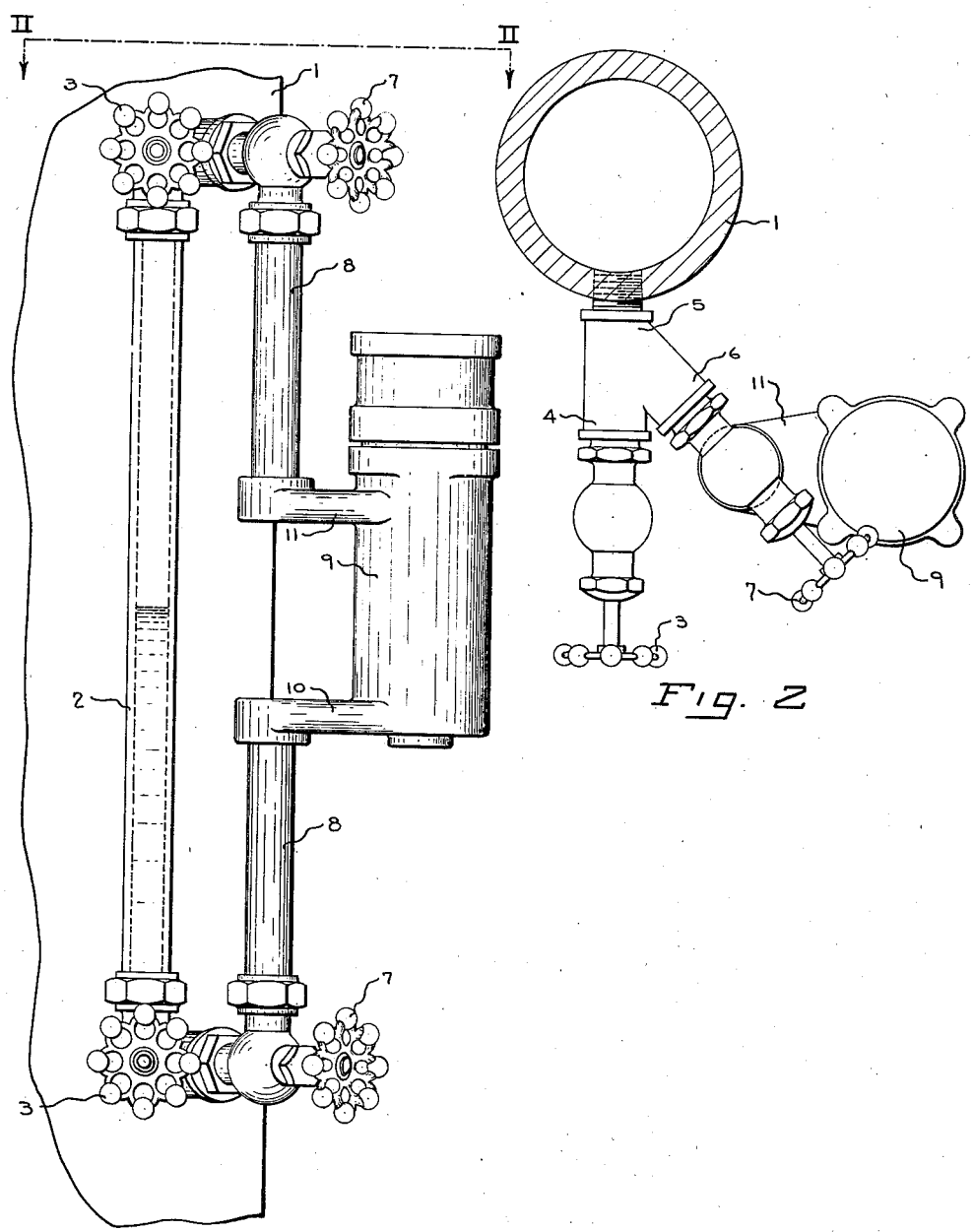

Aug. 1, 1939.    R. O. MONROE    2,168,267
WATER-LEVEL CONTROL
Filed April 12, 1937

Inventor
ROLLO O. MONROE
By Beaman + Langford
Attorneys

Patented Aug. 1, 1939

2,168,267

UNITED STATES PATENT OFFICE 2,168,267

WATER-LEVEL CONTROL

Rollo O. Monroe, Three Rivers, Mich., assignor to The Johnson Corporation, Three Rivers, Mich., a corporation of Michigan Application April 12, 1937, Serial No. 136,298

3 Claims. (Cl. 137—101)

This invention relates to boiler water level controls and more particularly to structure for connecting the water level responsive mechanism to the boiler.

Boiler water level controls often are connected to the tapped openings provided for attaching a gauge glass to the water column or directly to the boiler. Such an arrangement is convenient but since the spacing of the tapped openings varies with different installations and since the level at which it is desired to maintain the water level varies it is necessary to provide an assortment of sizes of water level responsive mechanisms and complex fittings so that for a given installation the correct equipment may be selected to maintain a desired water level.

An object of the invention is to provide structure for connecting the water level responsive mechanism to the tapped openings for the gauge glass of a boiler which permit the use of a single size of water level responsive mechanism for all installations.

Another object of the invention is to connect water responsive mechanism to tapped openings for the gauge glass of a boiler by means of fittings including vertical nipples the length of which are determined by the spacing between the tapped openings for the gauge glass.

These and other objects will be apparent from the following specification when taken with the accompanying drawing in which, Figure 1 is an elevation of the invention and Figure 2 is a section on the line II—II of Figure 1.

Referring particularly to the drawing the reference character 1 represents a water column having a usual gauge glass, 2. The gauge glass 2 is connected through usual valves or cocks 3 to the straightway portion 4 of the Y's 5 which are in turn connected to the tapped openings for the gauge glass connections in the water column 1. The use of the water column 1 is merely illustrative, for within the scope of this invention the gauge glass might be directly on a boiler or other container in which liquid is stored. The side outlets 6 of the Y's 5 are connected to valves 7 which are in turn connected to vertical nipples 8.

A water level responsive device housed in the hollow casing 9 may comprise any suitable float controlled mechanism but preferably comprises the electrodes disclosed in my copending application, Serial Number 86,479, filed June 22, 1936. Projecting laterally from the lower end of the casing 9 is a tube 10 and from a portion of the casing 9 inwardly from the ends is a tube 11. The outer end of the tube 10 opens downwardly and the outer end of the tube 11 opens upwardly, the outer ends of the tubes 10 and 11 being in vertical alignment. The tubes 10 and 11 are connected by the vertical nipples 8 to the valves 7. Thus, through the Y's 5 the valves 7, the nipples 8 and the tubes 10 and 11, the interior of the casing 9 is connected to the interior of the water column 1, with the result that the water level in the water column 1 is effective on the responsive device in the casing 9.

The advantages of the present invention will be clear from inspection of the drawing. The casing 9 may be placed at any desired vertical location by mere selection of nipples 8 of the correct length. As the nipples 8 are merely pieces of standard tubing and may be readily cut to any desired length, a single size casing 9 may be used where heretofore a large variety of sizes was required to accommodate different spacings between the tapped openings for attaching the gauge glass or special expensive fittings were necessary. The spacing of the tubes 10 and 11 is less than that of the closest tapped openings for attaching a gauge glass so that the casing 9 may be connected in any installation as well as at any desired location between the extremities of the gauge glass 2.

From Figure 2 it will be clear that in cases where an extremely short upper nipple 8 is required, the casing 9 may be rotated about the axis of the nipples 8 to avoid interference between the upper part of the casing 9 and the upper valve 7 or any other structure that might interfere. The tubes 10 and 11, of course, project a sufficient distance from the casing 9 to make this avoidance possible.

The water level responsive mechanism in the casing 9, operates any usual valve passing make up water either directly or indirectly to the boiler or other liquid container in which the liquid level is being maintained.

Having thus described my invention, what I desire to secure by Letters Patent and claim is:

1. In a boiler control for connection to variously spaced horizontally extending gauge glass openings of boilers or the like, the combination of a vertical level control mechanism housing, a tube extending horizontally from a fixed point on said housing adjacent the lower end thereof, a second tube extending horizontally from a fixed point on said housing above said first named fixed point, nipples secured in the ends of said tubes, the nipple secured to first named tube projecting vertically downwardly and the nipple secured to said second tube projecting vertically upwardly, Y's for connection to gauge glass openings and a gauge glass supported by said Y's, said nipples being connected to said Y's, whereby said housing may be connected between gauge glass openings of any predetermined spacing and selectively positioned between said gauge glass openings by using nipples of the required length.

2. In a boiler control for connection to variously spaced horizontally extending gauge glass openings, the combination of a vertical liquid level control mechanism housing, two laterally extending vertically spaced liquid conducting means projecting from fixed points on said housing, the outer ends of said projecting means being in vertical alignment, liquid conducting means connected to the outer ends of said projecting means and projecting in opposite directions in vertical alignment, said first named means projecting sufficiently far from said housing in a lateral direction to provide clearance between said second named means and said housing, and means mounting said second named means, the connection between each of said means being characterized by the fact that said housing is oscillatable about the axis of said second named means, said mounting means being at substantially the level of the respective gauge glass openings.

3. In a liquid level control for connection to gauge glass openings the combination of conduit means secured in said openings, a gauge glass mounted between said means, a liquid level control mechanism housing, and conduit means supporting said housing from said first named means providing fluid communication from the gauge glass openings to the interior of said housing, said supporting means comprising a pair of straight nipples vertically disposed to be in parallelism with the gauge glass and a pair of tubes extending laterally from said housing whereby said housing is entirely positioned to one side of said nipples, the outer ends of said nipples being connected to said first named means at substantially the levels of the respective gauge glass openings.

ROLLO O. MONROE.